A. F. C. GARBEN.

Assignor to R. B. LANGDON.

HUB ATTACHING DEVICE.

No. 10,874. Reissued Oct. 18, 1887.

Witnesses

Emma F. Elmore

Geo. M. Bennett

Inventor

Adolph F. C. Garben

By his Attorney

Jas. F. Williamson

W. PETERS, Photo-Lithographer, Washington, D. C.

UNITED STATES PATENT OFFICE.

ADOLPH F. C. GARBEN, OF MINNEAPOLIS, MINNESOTA, ASSIGNOR TO ROBERT B. LANGDON, OF SAME PLACE.

HUB-ATTACHING DEVICE.

SPECIFICATION forming part of Reissued Letters Patent No. 10,874, dated October 18, 1887.

Original No. 333,621, dated January 5, 1886. Application for reissue filed January 31, 1887. Serial No. 226,087.

*To all whom it may concern:*

Be it known that I, ADOLPH F. C. GARBEN, a citizen of the United States, residing at Minneapolis, in the county of Hennepin and State of Minnesota, have invented a new and useful Device for Attaching Hubs to Vehicles, of which the following is a full, clear, and exact description, reference being had to the accompanying drawings, forming part of this specification, in which—

Figure 1:
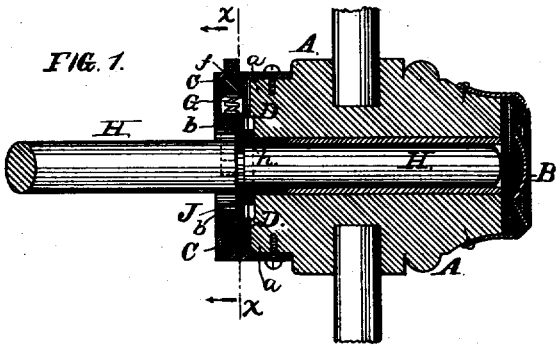
Figure 2:
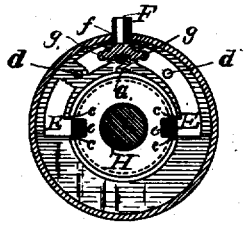
Figure 3:
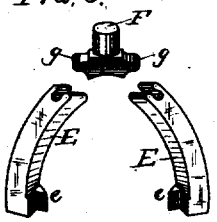
Figure 4:
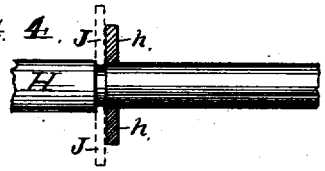
Figure 4:
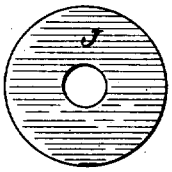

Figure 1 represents a vertical longitudinal sectional view of a hub and spindle embodying my improvements. Fig. 2 represents a cross-sectional view on the line *x x* of Fig. 1. Fig. 3 represents details of the locking mechanism. Fig. 4 is a detail of the spindle, showing the fast and loose collars and washer.

My invention relates to an improved means for fastening wheels to baby-carriages, velocipedes, boys' express-wagons, and similar conveyances, whereby the wheels may be readily attached to or detached from the axles without difficulty, and dispensing with the threaded spindle and nut now commonly used for the same purpose; and my invention consists in the peculiar mechanism hereinafter fully described and particularly claimed.

To enable others skilled in the art to which my invention appertains, I will now proceed to describe its construction and the manner in which I have carried it out.

In the said drawings, A represents the hub of a baby-carriage or similar wheeled vehicle, which will be provided with the ordinary spokes and fellies, but which are not shown, as they may be of usual construction and form no part of my invention.

B represents a metallic cap or covering for the exterior of the hub and protects the ends of the spindle from dust or other foreign matter.

The hub A is provided with a reduced portion, *a*, upon which is fitted and securely held, by means of screws or other suitable fastening devices, the hollow perforated cap C, which is bored to receive a spindle carrying a fixed and also in my preferred construction a loose collar or washer, as I shall hereinafter describe. The cap C has an inwardly-projecting flange, *b*, which is transversely slotted at *c*, and between the flange *b* and the inner periphery of the outside flange of the cap is secured the locking mechanism, the several parts of the same being held in position and protected from dust by a disk, D, as shown in Fig. 1. The cap C is also provided with pins *d*, upon which are fulcrumed the jaws E, which lock the hub to the spindle. These jaws are preferably curved, and at their lower ends are provided with catches *e*, which project through the slots in the flange *b*, while the upper ends of the jaws are notched or slotted and adapted to engage suitable projections, *g*, upon each side of a vertically moving and actuating bolt, F. This bolt F passes through a perforation, *f*, in the cap C, and also engages a spring, G, which is interposed between the bottom of bolt F and the top of the flange *b*, and immediately forces the bolt and jaws back to their normal position when the pressure is removed from the bolt.

The spindle H, in the present instance, is especially adapted to the locking mechanism just described, and is provided with a collar, *h*, which is firmly secured to the spindle. In close proximity to the collar on the side toward the axle is loosely mounted a washer, J, which, when the spindle is inserted, engages the bevel faces of the jaws E and forces these jaws backward sufficiently far to allow the washer to enter that portion of the cap C formed by the flange *b*, when the jaws are immediately thrown outward by the force of the spring G, and engaging the washer firmly hold the same, thereby dispensing with the friction and squeaking noise incident to many of the light vehicles now in general use, and also effectively preventing dust and other foreign substance from coming in contact with the lubricated portion of the spindle.

From the foregoing description it is manifest that wheels may be attached to the spindles of vehicles very securely and with comparatively little inconvenience, which is not the case when the spindle is threaded and a securing-nut employed, as often the threads are imperfectly cut and the wheels are liable either in their rotation to turn off the nut or to tighten the same to such an extent as to prevent the wheels from revolving.

When it is necessary to detach the wheel to lubricate the spindle, it may be readily done by depressing the actuating-bolt F, which releases the jaws from their contact with the loose washer J, when the parts may be removed without further trouble.

The simplicity of construction and the ease with which the parts are disconnected is of great importance, as it enables ladies and children to attach or detach the wheel in a moment and without any tool, and also facilitates the oiling of the spindle, which is a necessity, and cannot often be performed by ladies or children when nuts and wrenches have to be applied. This construction also enables dealers to save time and trouble in putting their articles together, and in other ways is superior to many of the devices employed for securing hubs to axles.

The loose washer has its center bored out. It is placed in position by slipping it over the head of the spindle and back against the axle-shoulder before the rigid collar *h* is put on the spindle. The rigid collar is then placed on the spindle and shrunk fast to the same in proper position. The loose washer is thus held on the spindle between the axle-shoulder and the rigid collar.

What I claim as new, and desire to secure by Letters Patent of the United States, is as follows:

1. In a device for attaching wheels to vehicles, a spindle, in combination with a loosely-mounted rotating washer and suitable automatically-operating spring-jaws adapted to engage the washer and rotate the same by frictional contact, substantially as herein described.

2. The combination, with a spindle having a rigid collar, *h*, of a loosely-mounted washer rotated by frictional contact with automatically-operating jaws, substantially as described.

3. In a device for attaching wheels to vehicles, a hub having automatically-operating spring-jaws, in combination with a spindle having a loose washer, whereby the spindle may be inserted within the hub and be held by means of the jaws rigidly engaging the washer, substantially as herein described.

4. An improved means for attaching or detaching hubs of wheeled vehicles to their spindles, consisting in a spindle having an immovable collar and a loosely-revolving washer, J, in combination with a hub having the automatically-operating jaws E, and an actuating-bolt, F, having projections which engage the jaws, substantially as described.

5. The spindle H, having rigid collar *h*, and the loosely-revolving washer J, in combination with the hub A, the cap C, having the pins *d*, the automatically-operating curved jaws E, provided with catches, the bolt F, having projections which engage the slotted upper ends of the jaws, a spring, G, and a disk, D, substantially as herein described.

6. In combination, for detachably connecting wheels to vehicles, the spindle H, provided with rigid collar *h*, the hub A, the cap C, having the fulcrum-pins *d*, the automatically-operating curved jaws E, fulcrumed on said pins *d* and provided with the catches *e*, the actuating-bolt F, having projections engaging the slotted upper ends of the jaws E, and a spring, G, for holding the jaws in their locking position, substantially as and for the purpose described.

7. In combination, the spindle H, provided with the rigid collar *h*, the hub A, the cap C, having fulcrum-pins *d*, the curved jaws E, provided with catches *e* on their lower extremities and having transverse slots in their upper extremities, the actuating-bolt F, having projections *g*, engaging said slots, a spring, G, for holding the jaws in their locking position, and the shielding-disk D, substantially as and for the purpose described.

ADOLPH F. C. GARBEN.

In presence of—
JAS. F. WILLIAMSON,
EMMA F. ELMORE.